US010348694B2

(12) United States Patent
Cho et al.

(10) Patent No.: US 10,348,694 B2
(45) Date of Patent: Jul. 9, 2019

(54) METHOD OF PROVIDING SECURITY FOR CONTROLLER USING ENCRYPTION AND APPARATUS THEREOF

(71) Applicant: Hyundai Motor Company, Seoul (KR)

(72) Inventors: A Ram Cho, Suwon-si (KR); Hyun Soo Ahn, Seoul (KR); Ho Jin Jung, Seoul (KR)

(73) Assignee: Hyundai Motor Company, Seoul (KR)

( * ) Notice: Subject to any disclaimer, the term of this patent is extended or adjusted under 35 U.S.C. 154(b) by 238 days.

(21) Appl. No.: 15/374,939

(22) Filed: Dec. 9, 2016

(65) Prior Publication Data

US 2017/0339115 A1 Nov. 23, 2017

(30) Foreign Application Priority Data

May 17, 2016 (KR) ........................ 10-2016-0060092

(51) Int. Cl.
*H04L 9/32* (2006.01)
*H04L 29/06* (2006.01)
*H04L 9/08* (2006.01)
*H04L 9/14* (2006.01)
*H04W 12/02* (2009.01)
*H04W 12/06* (2009.01)
*H04W 4/02* (2018.01)
*H04W 4/90* (2018.01)

(52) U.S. Cl.
CPC ........ *H04L 63/0428* (2013.01); *H04L 9/0819* (2013.01); *H04L 9/14* (2013.01); *H04L 9/3263* (2013.01); *H04L 9/3271* (2013.01); *H04L 63/08* (2013.01); *H04W 12/02* (2013.01); *H04W 12/06* (2013.01); *H04L 2209/84* (2013.01); *H04W 4/02* (2013.01); *H04W 4/90* (2018.02)

(58) Field of Classification Search
CPC . H04L 63/0428; H04L 9/3271; H04L 9/0819; H04L 9/14; H04L 63/08; H04L 9/3263; H04L 2209/84; H04W 12/02; H04W 12/06; H04W 4/90; H04W 4/02
See application file for complete search history.

(56) References Cited

U.S. PATENT DOCUMENTS

| | | | | |
|---|---|---|---|---|
| 5,774,550 A | * | 6/1998 | Brinkmeyer | ............ B60R 25/00 340/5.7 |
| 5,926,546 A | * | 7/1999 | Maeda | ................ H04L 63/0428 380/270 |
| 6,151,676 A | * | 11/2000 | Cuccia | ................. H04L 9/3013 380/259 |

(Continued)

FOREIGN PATENT DOCUMENTS

| | | |
|---|---|---|
| JP | 2005-276113 A | 10/2005 |
| JP | 2012-57362 A | 3/2012 |

(Continued)

*Primary Examiner* — Mohammed Waliullah
(74) *Attorney, Agent, or Firm* — Morgan, Lewis & Bockius LLP

(57) ABSTRACT

A method of authenticating a controller by a gateway in a vehicle may include transmitting a first symmetric key to the controller; generating a first one-time authentication value (OTAV), encrypting the first OTAV with the first symmetric key and delivering the encrypted first OTAV to the controller; sending a request for authentication using the first OTAV to the controller; and receiving a hash value from the controller in response to the request.

13 Claims, 9 Drawing Sheets

(56) References Cited

U.S. PATENT DOCUMENTS

| | | | | |
|---|---|---|---|---|
| 6,952,475 B1* | 10/2005 | Horn | H04L 9/0844 | 380/30 |
| 7,010,682 B2* | 3/2006 | Reinold | H04L 9/3271 | 7/100 |
| 7,197,642 B2* | 3/2007 | Walmsley | H04L 9/3271 | 380/259 |
| 7,222,238 B2* | 5/2007 | Bleumer | H04L 9/3226 | 705/60 |
| 7,320,059 B1* | 1/2008 | Armangau | G06F 17/30085 | 711/100 |
| 7,403,622 B2* | 7/2008 | Diehl | H04L 12/2803 | 380/205 |
| 7,975,139 B2* | 7/2011 | Coulier | H04L 63/0435 | 713/168 |
| 8,078,874 B2* | 12/2011 | You | H04L 9/0869 | 713/175 |
| 8,209,535 B2* | 6/2012 | Lee | G06F 21/445 | 380/247 |
| 8,407,470 B2* | 3/2013 | Nakanishi | G08C 17/02 | 340/426.35 |
| 8,732,454 B2* | 5/2014 | Furukawa | H04L 63/062 | 713/153 |
| 8,886,943 B2* | 11/2014 | Kiessling | B60R 25/00 | 713/150 |
| 9,830,101 B2* | 11/2017 | Christ | G06F 3/067 | |
| 9,960,915 B2* | 5/2018 | Ahn | H04L 9/0869 | |
| 2003/0014372 A1* | 1/2003 | Wheeler | G06F 21/32 | 705/71 |
| 2003/0065930 A1* | 4/2003 | Fukushima | G06F 21/606 | 713/189 |
| 2003/0070067 A1* | 4/2003 | Saito | H04L 63/0435 | 713/150 |
| 2004/0250073 A1* | 12/2004 | Cukier | H04L 9/0822 | 713/171 |
| 2005/0177714 A1* | 8/2005 | Jeong | G06F 21/445 | 713/155 |
| 2006/0129814 A1* | 6/2006 | Eun | H04L 63/08 | 713/168 |
| 2006/0230437 A1* | 10/2006 | Alexander Boyer | G06F 21/6245 | 726/4 |
| 2006/0233374 A1* | 10/2006 | Adams | G06Q 20/341 | 380/268 |
| 2007/0064936 A1* | 3/2007 | Kasahara | G11B 20/00086 | 380/45 |
| 2008/0155260 A1* | 6/2008 | Perez | H04L 9/0869 | 713/169 |
| 2008/0276092 A1* | 11/2008 | Eberhardt | H04L 9/3236 | 713/175 |
| 2008/0301466 A1* | 12/2008 | Hsu | G06F 8/65 | 713/189 |
| 2009/0202071 A1* | 8/2009 | Kato | G11B 20/00086 | 380/201 |
| 2010/0001840 A1* | 1/2010 | Kang | H04Q 9/00 | 340/10.1 |
| 2010/0211793 A1* | 8/2010 | Park | H04N 7/162 | 713/176 |
| 2011/0066856 A1* | 3/2011 | Yao | H04L 9/3271 | 713/170 |
| 2013/0214909 A1* | 8/2013 | Meijers | H04W 4/029 | 340/10.5 |
| 2014/0237246 A1* | 8/2014 | Brown | H04L 63/062 | 713/171 |
| 2014/0270172 A1* | 9/2014 | Peirce | H04L 9/0819 | 380/270 |
| 2015/0163056 A1* | 6/2015 | Nix | H04L 9/0869 | 380/46 |
| 2015/0222439 A1* | 8/2015 | Bhattacharya | H04L 67/12 | 713/169 |
| 2015/0264017 A1* | 9/2015 | Saed | H04L 63/045 | 380/270 |
| 2016/0097648 A1* | 4/2016 | Hannah | G06K 9/00785 | 701/118 |
| 2016/0236653 A1* | 8/2016 | Katou | B60R 25/248 | |
| 2017/0070488 A1* | 3/2017 | Jun | H04L 9/0833 | |
| 2017/0111357 A1* | 4/2017 | Unagami | H04L 9/0631 | |
| 2017/0185103 A1* | 6/2017 | Kim | H04B 1/38 | |
| 2017/0236343 A1* | 8/2017 | Leboeuf | H04L 9/0825 | 340/5.61 |
| 2018/0006819 A1* | 1/2018 | Watanabe | G06F 21/44 | |
| 2018/0063711 A1* | 3/2018 | Rivera | H04W 12/06 | |

FOREIGN PATENT DOCUMENTS

| | | |
|---|---|---|
| JP | 2013-219710 A | 10/2013 |
| JP | 2014-6730 A | 1/2014 |
| KR | 10-1999-0072922 A | 9/1999 |
| KR | 10-2002-0055544 A | 7/2002 |
| KR | 10-1366243 B1 | 2/2014 |

* cited by examiner

METHOD OF PROVIDING SECURITY FOR CONTROLLER USING ENCRYPTION AND APPARATUS THEREOF

CROSS REFERENCE TO RELATED APPLICATION

The present application claims priority to Korean Patent Application No. 10-2016-0060092, filed on May 17, 2016, the entire contents of which is incorporated herein for all purposes by this reference.

BACKGROUND OF THE INVENTION

Field of the Invention

The present invention relates to a method of managing a controller with reliability and, more particularly, to an efficient controller authentication method in controller authentication using a certificate, and an apparatus therefor.

Discussion of the Related Art

To prevent theft of a controller mounted in a vehicle or use of a non-genuine controller in a vehicle, a method of using an anti-theft system has been used. However, anti-theft systems may be destroyed or disassembled and require additional cost. Due to such problems, a management method through a management center based on controller identifiers has been proposed.

The identifier-based management method allocates an identifier per controller and stores identifiers in the management center as management data such that an identification device in a vehicle, such as a gateway, can inquire into identifiers corresponding to controllers registered as genuine products in the management center. Accordingly, when a vehicle internal system is started, the identification device checks whether the identifier of a target controller corresponds to stored identifiers and acknowledges communication with respect to the corresponding identifier. However, this method does not employ an encryption algorithm, and thus identifiers may be exposed to malicious hackers during communication for identifier transmission. In this case, genuine product certification of a controller corresponding to an exposed identifier may be used for other non-genuine controllers.

To solve such problem, use of genuine controllers may be compelled using a public key encryption algorithm. However, it is difficult to provide a real-time security function in vehicles with current calculation capability of vehicle controllers.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method of managing a controller of a vehicle with reliability and an apparatus therefor.

Various aspects of the present invention are directed to providing safer encryption based authentication and communication methods for controller management.

Various aspects of the present invention are directed to providing a controller authentication method that can perform an initial process faster than public key based controller authentication and requires a low operation load.

It will be appreciated by persons skilled in the art that the objects that could be achieved with the present invention are not limited to what has been particularly described hereinabove and the above and other objects that the present invention could achieve will be more clearly understood from the following detailed description.

In an aspect of the present invention to accomplish the object, a method of authenticating a controller by a gateway in a vehicle includes: transmitting a first symmetric key to the controller; generating a first one-time authentication value (OTAV), encrypting the first OTAV with the first symmetric key and delivering the encrypted first OTAV to the controller; sending a request for authentication using the first OTAV to the controller; and receiving a hash value from the controller in response to the request.

In another aspect of the present invention, a method of performing authentication by a controller with respect to a gateway in a vehicle includes: receiving a first symmetric key from the gateway; receiving a first OTAV encrypted with the first symmetric key; receiving a request for authentication using the first OTAV from the gateway; and transmitting a hash value of the first OTAV to the gateway in response to the request.

According to at least one embodiment of the present invention, a vehicle controller can be managed more safely.

Particularly, a controller that is not certificated as a genuine product cannot perform communication when the vehicle in which the controller is mounted is driven, and thus it is possible to compel use of genuine controllers to improve product reliability.

In addition, since an initial controller authentication process can be performed more rapidly through symmetric key authentication, controller verification and key distribution can be achieved within a range of minimizing the influence on vehicle driving.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
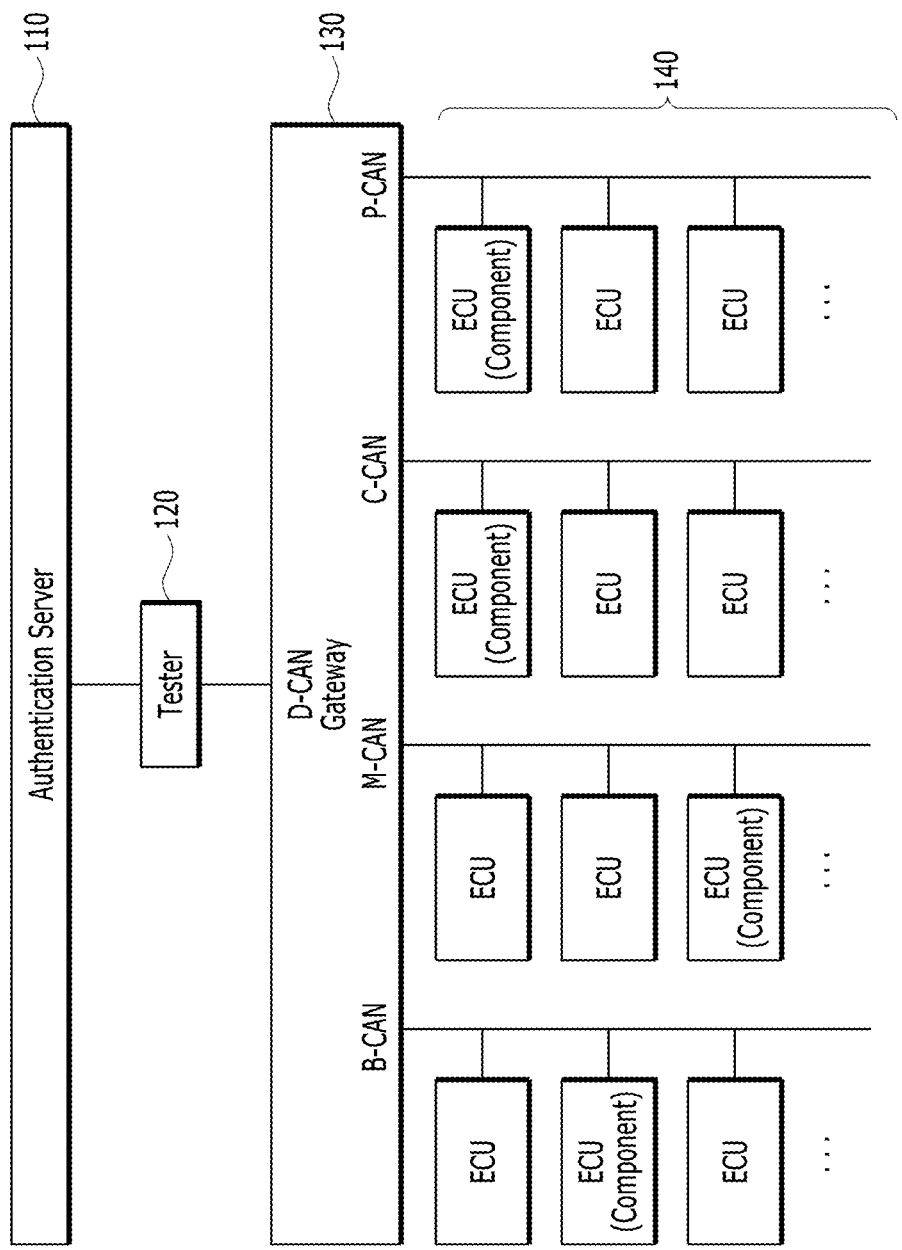
FIG. 1 is a block diagram of a system applicable to embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Embodiments of the present invention are applicable to a gateway, a controller and a tester. A system architecture including the gateway, the controller and the tester will now be described with reference to FIG. 1.

FIG. 1 is a block diagram of an exemplary system architecture to which embodiments of the present invention are applicable.

Referring to FIG. 1, the system to which embodiments of the present invention can be applied may include an authentication server 110, a tester 120, a vehicle gateway 130 and controllers 140.

The authentication server 110 enables an identification device in a vehicle to inquire as to identifiers of products registered as genuine products in a management center. The tester 120 may serve as a data path between the vehicle gateway 130 and the server 110. The gateway manages the controllers 140.

Embodiments of the present invention describe data exchange between the tester 120, the gateway 130 and the controller 140 and authentication thereof, and a communication environment between the authentication server 110 and the tester 120 is not described unless otherwise mentioned (that is, communication between the server and the tester is not limited).

Monitoring of genuine product management and use of non-genuine components for controllers according to controller management methods of embodiments of the present invention may be divided into the following five steps.

A. Controller unit production
B. Vehicle assembly
C. Monitoring during traveling of vehicle
D. Controller unit unmounting
E. Controller unit mounting Embodiments of the present invention commonly include a certificate verification process through which reliability between communication targets can be secured.

A description will be given of software architectures of devices applied to an exemplary embodiment of the present invention with reference to FIGS. 2, 3 and 4.

Figure 2:
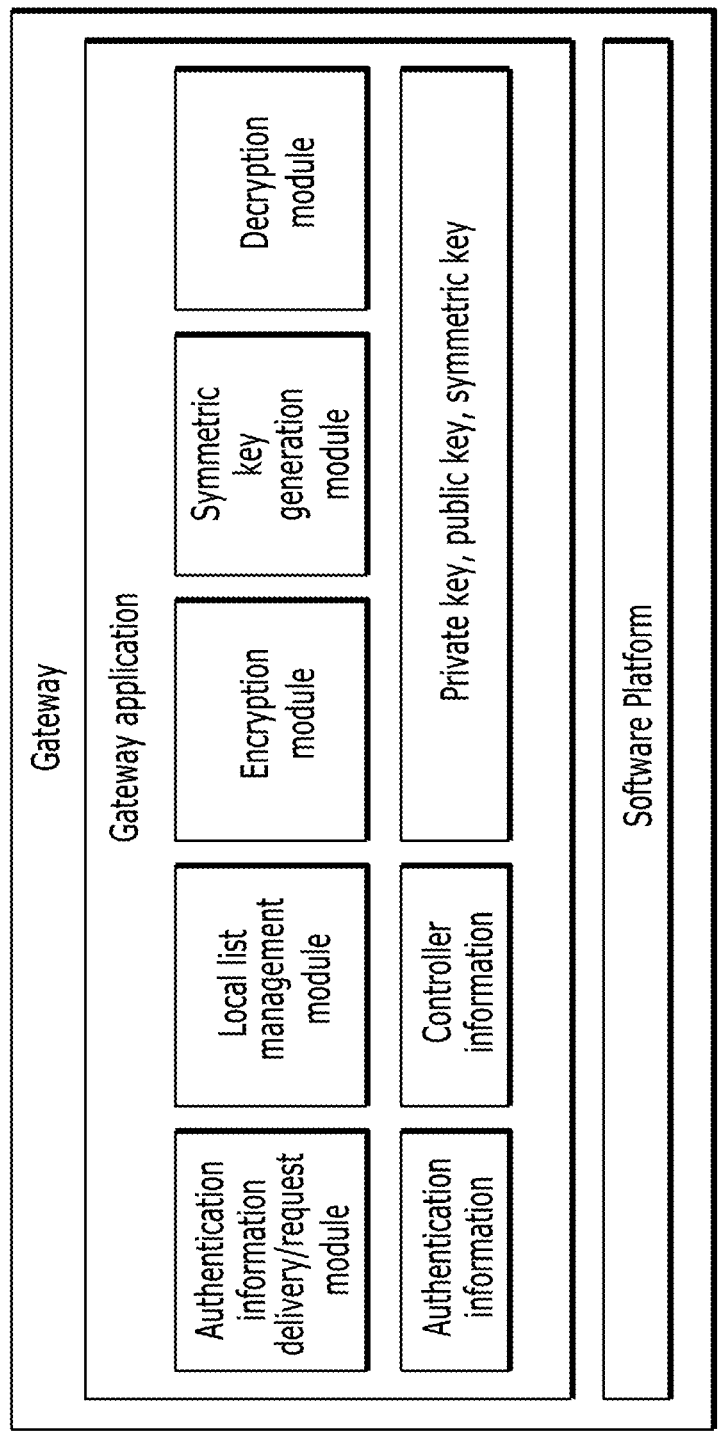
FIG. 2 illustrates an exemplary gateway software architecture according to an exemplary embodiment of the present invention.

FIG. 2 illustrates an exemplary gateway software architecture according to an exemplary embodiment of the present invention.

Referring to FIG. 2, an authentication information delivery/request module executes a function of the gateway to deliver a certificate thereof to a communication target or to request a certificate of the communication target before communication.

A local list management module executes a function of providing a local list managed to a tester upon reception of a local list request from the tester. Here, the local list may include certificates of controllers connected to the gateway during a vehicle assembly stage. The local list management module may update the local list in case of generation of a controller unit mounting or unmounting event after vehicle assembly.

Messages other than messages delivering certificates from the gateway to the tester or controllers require an encryption process. An encryption module performs the encryption process. While a key used for encryption is a private key of the gateway in general, a symmetric key instead of the private key of the gateway is used when the corresponding vehicle is delivered to a user and normally driven in the present embodiment.

A symmetric key generation module periodically regenerates the symmetric key after the vehicle is delivered to the user in order to enhance security.

A decryption process is required to decrypt a message encrypted in a controller and delivered. The decryption process is performed by a decryption module. While a key used for decryption is a public key of the controller in most cases, a symmetric key instead of the public key is used when the vehicle is delivered to the user and normally driven in the present embodiment.

In addition to the aforementioned modules, authentication information including the gateway certificate, controller information including controller certificates and keys (private key, public key and symmetric key) used for security procedures may compose a gateway application.

Figure 3:
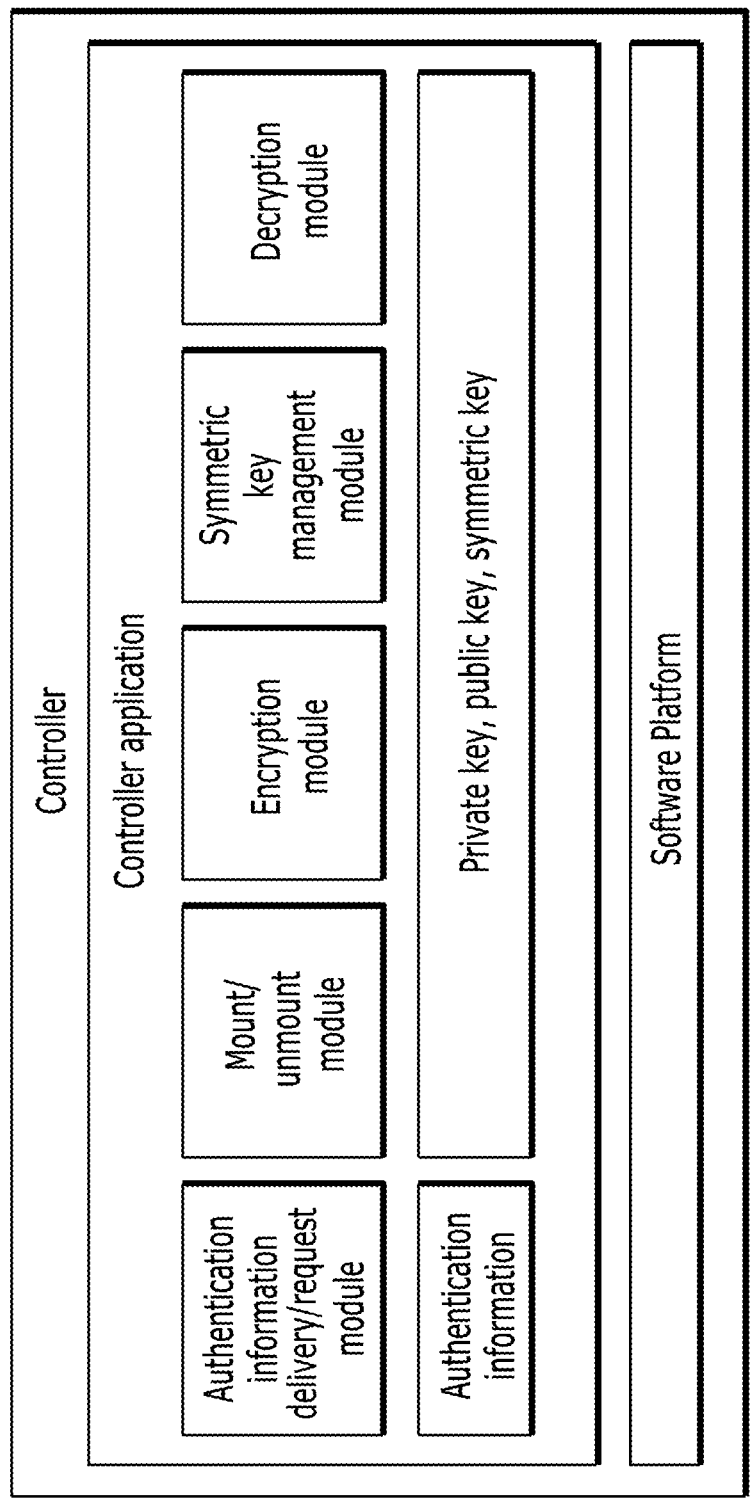
FIG. 3 illustrates an exemplary controller software architecture according to an exemplary embodiment of the present invention.

FIG. 3 illustrates an exemplary controller software architecture according to an exemplary embodiment of the present invention.

Referring to FIG. 3a, an authentication information delivery/request module executes a function of a controller to deliver a certificate thereof to a communication target before communication.

A mount/unmount module receives a mount/unmount request message from a tester and delivers a mount/unmount response message to the tester. Upon delivery of a mount/unmount confirmation message from the tester to the controller after a mount/unmount procedure with respect to the gateway, the controller stores a mount/unmount mode and a gateway certificate hash.

Messages other than messages delivering certificates from the controller to the tester or the gateway require an encryption process. An encryption module performs the encryption process. While a key used for encryption is a private key of the controller in general, a symmetric key instead of the private key of the controller is used when the corresponding vehicle is delivered to a user and normally driven in the present embodiment.

A symmetric key management module periodically stores the symmetric key generated in the gateway after the vehicle is delivered to the user. The symmetric key is used as a key for encryption when the vehicle travels.

A decryption process is required to decrypt a message encrypted and delivered. The decryption process is performed by a decryption module. While a key used for decryption is a public key of the gateway in general, a symmetric key instead of the public key is used when the vehicle is delivered to the user and normally driven in the present embodiment.

In addition to the aforementioned modules, authentication information including the gateway certificate and keys (private key, public key and symmetric key) used for security procedures may compose a controller application.

A detailed description will be given of operation processes between the aforementioned devices, which are performed in step C, according to the present embodiment on the basis of the aforementioned structures of the devices.

A description will be given of an operation processes between the gateway and a controller when the corresponding vehicle travels with reference to FIGS. 4, 5 and 6.

Figure 4:
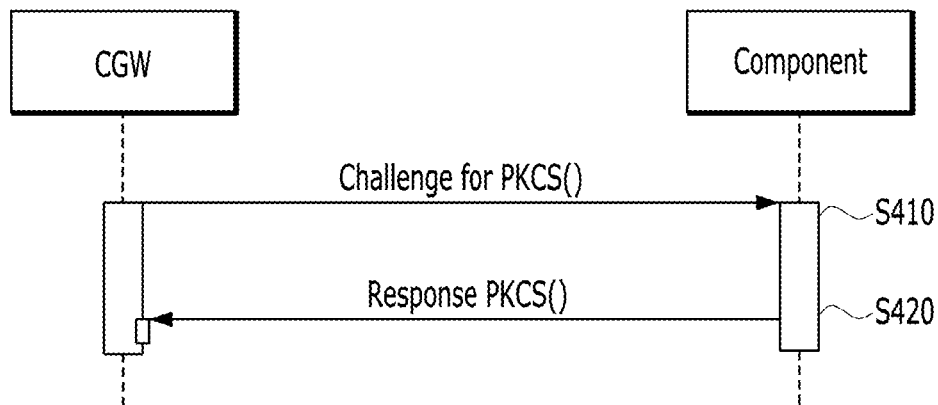
FIG. 4 illustrates an exemplary process of determining whether to distribute a symmetric key when a vehicle travels according to an exemplary embodiment of the present invention.

FIG. 4 illustrates an exemplary process of determining whether to distribute a symmetric key when the vehicle travels according to an exemplary embodiment of the present invention.

The gateway generates a random number in order to verify whether the controller is genuine and sends the random number to the controller through a Challenge for PKCS message (S410). This procedure can be performed when a symmetric key used for vehicle driving is initially distributed (in case of starting the vehicle) or a predetermined symmetric key use period expires.

Upon reception of the Challenge for PKCS message, the controller attaches an electronic signature to the random number included in the message using a private key thereof and sends the signature value to the gateway through a Response PKCS message (S420).

The gateway verifies the signature and distributes a symmetric key to be used when the vehicle travels upon successful verification. The symmetric key distribution process will now be described with reference to FIG. 5.

Figure 5:
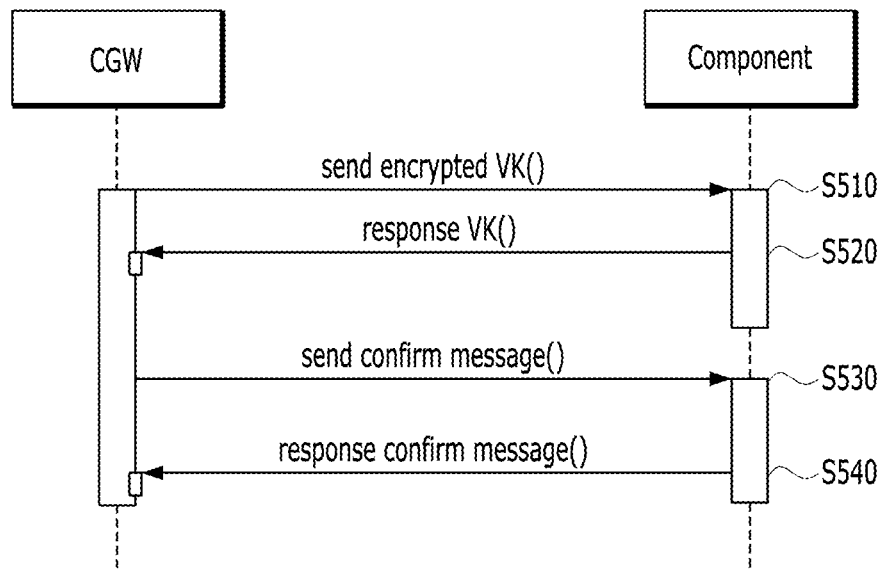
FIG. 5 illustrates an exemplary process of distributing a symmetric key when a vehicle travels according to an exemplary embodiment of the present invention.

FIG. 5 illustrates an exemplary process of distributing a symmetric key when the vehicle travels according to an exemplary embodiment of the present invention. The process of FIG. 5 is preferably performed upon successful verification of the signature of the controller after the process of FIG. 4 has been normally performed, that is, after the gateway has initially distributed the symmetric key to the controller or after periodic controller authentication using the symmetric key after symmetric key distribution has failed.

For symmetric key distribution, the gateway encrypts the symmetric key using a public key of the controller and sends an encrypted VK message to the controller (S510).

The controller may receive the encrypted symmetric key through the encrypted VK message and decrypt the encrypted symmetric key using the private key thereof to acquire the symmetric key. Thereafter, the controller sends a response VK message to the gateway for symmetric key reception confirmation (S520).

Upon reception of the response VK message, the gateway sends a confirmation message to the controller in order to approve use of the symmetric key (S530).

The controller may send a response confirmation message to the gateway in response to the confirmation message (S540).

The symmetric key can be effectively used for message exchange between the controller and the gateway.

The authentication method through a signature, described with reference to FIG. 4, has a problem when performed whenever a controller is authenticated since the quantity of determinations and the quantity of data exchange become a burden on normal vehicle controllers. Accordingly, the present embodiment proposes a process through which the gateway authenticates a controller using a periodic message authentication code (MAC) comparison method using a relatively simple random number after completion of symmetric key exchange (while the symmetric key is valid). This is described with reference to FIG. 6.

Figure 6:
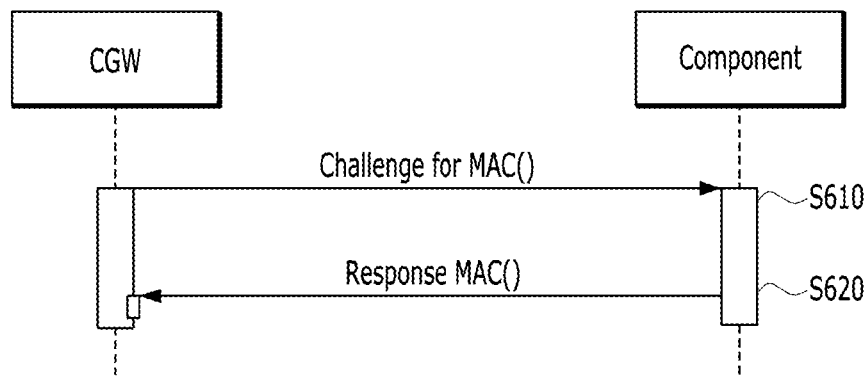
FIG. 6 illustrates an exemplary periodic controller authentication process using a symmetric key when a vehicle travels according to an exemplary embodiment of the present invention.

FIG. 6 illustrates an exemplary periodic controller authentication process using a symmetric key during vehicle driving according to an exemplary embodiment of the present invention.

Referring to FIG. 6, when symmetric key validity is present between the gateway and the controller, the gateway generates a random number in order to authenticate the controller and sends the random number to the controller through a Challenge for MAC message (S610).

The controller generates a MAC of the received random number using the symmetric key and sends the MAC to the gateway through a Response MAC message (S620).

Upon reception of the Response MAC message, the gateway may generate a MAC in the same manner as the controller and compare the generated MAC with the MAC received from the controller to authenticate the controller.

The process of FIG. 6 is more efficient than the process of FIG. 4 which is difficult to periodically perform since the process of FIG. 6 can considerably reduce the quantity of determinations and data exchange, compared to the security procedure through a certificate, shown in FIG. 4.

According to another aspect of the present embodiment, controller authentication may be performed using a one-time authentication value (OTAV). More specifically, the gateway may generate an OTAV and deliver the OTAV to the controller. The controller may be authenticated by sending a response to the gateway using a hash value of a previously acquired OTAV at the request of the gateway for authentication. Here, the gateway may encrypt the OTAV using a symmetric key of the corresponding session when generating the OTAV. Upon successful authentication using the OTAV, the gateway may encrypt a symmetric key to be used for the next session using the symmetric key of the corresponding session and deliver the encrypted symmetric key to the controller. This is described with reference to FIGS. 7 and 8.

Figure 7:
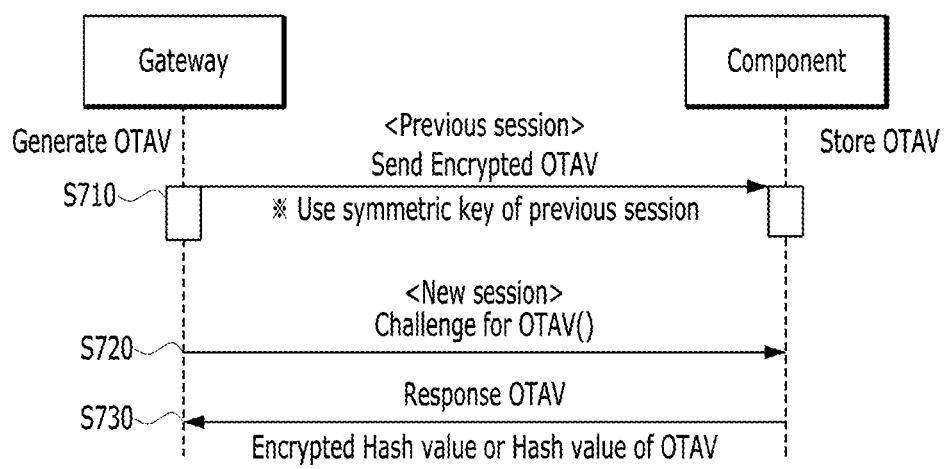
FIG. 7 illustrates an exemplary controller authentication process using a one-time authentication value according to an exemplary embodiment of the present invention.

FIG. 7 illustrates an exemplary controller authentication process using an OTAV according to an exemplary embodiment of the present invention.

FIG. 7 assumes that a symmetric key is previously distributed from the gateway to the controller through the processes described with reference to FIG. 4 and FIG. 5 and a process which will be described with reference to FIG. 8.

Referring to FIG. 7, the gateway generates an OTAV to be used for authentication, encrypts the OTAV using a symmetric key of the corresponding session and sends the encrypted OTAV to the controller through a Send Encrypted OTAV message (S710). The controller stores the OTAV in a nonvolatile memory space therein, and the OTAV is used one time at the request of the gateway for the OTAV.

When a new session is started, the gateway sends a request for authentication using the OTAV shared in the previous session, instead of the conventional public key based authentication, through a Challenge for OTAV message (S720).

The controller encrypts a hash value of the OTAV and transmits the OTAV through a Response OTAV message or sends the OTAV in the form of plaintext through the Response OTAV message to the gateway at the request of the gateway for authentication (S730). Upon reception of the message, the gateway generates a hash value of an OTAV stored therein and compares the generated hash value with the hash value received from the controller so as to authenticate the controller.

Upon completion of controller authentication in the new session, the gateway may distribute a new symmetric key to be used in the next session to the controller. This is described with reference to FIG. 8.

Figure 8:
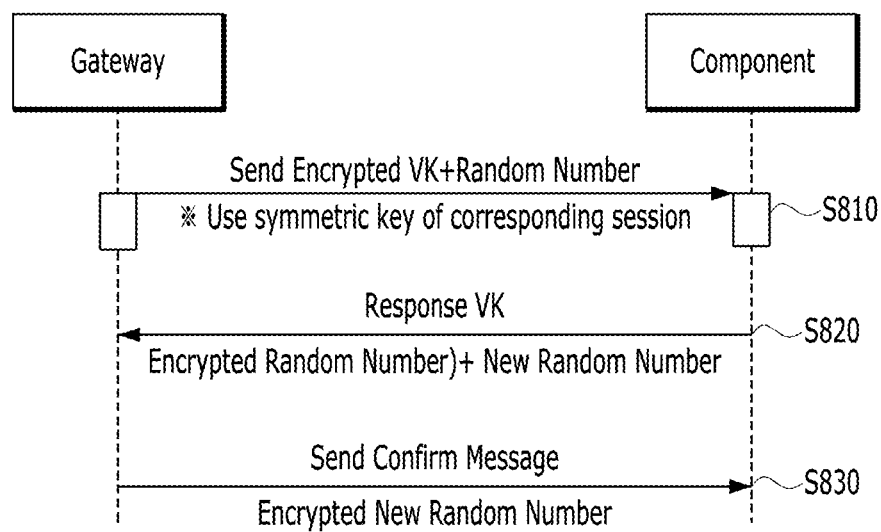
FIG. 8 illustrates an exemplary process of distributing a new symmetric key for the next session in the controller authentication process using the one-time authentication value according to an exemplary embodiment of the present invention.

FIG. 8 illustrates an exemplary process of distributing a new symmetric key for the next session in the controller authentication process using an OTAV according to an exemplary embodiment of the present invention.

When OTAV authentication described with reference to FIG. 7 has been successfully performed, the gateway generates a new symmetric key to be used in the next session and a random number for confirming reception of the symmetric key, encrypts the symmetric key using the symmetric key of the corresponding session (i.e. session prior to the next session using the new symmetric key) and transmits the encrypted symmetric key to the controller (S810).

The controller stores the received new session key, encrypts the random number received for key reception confirmation and another random number for key confirmation using the new symmetric key and sends the encrypted random numbers to the gateway (S820).

The gateway checks the values received from the controller, confirms key reception of the controller by comparing the received values with the random number sent to the controller in step S810 and verifying the received value, encrypts the other random number received from the controller using the new symmetric key and transmits the encrypted random number to the controller (S830).

The controller decrypts the other random number received from the gateway and compares the decrypted random number with another random number stored in the controller to verify validity of the new symmetric key.

A description will be given of a vehicle operation in the case of failure of authentication using an OTAV according to an exemplary embodiment of the present invention.

The gateway may add an OTAV authentication failure DTC fault code to a DTC code list of vehicle diagnostic communication and generate an OTAV authentication function check flag. More specifically, the gateway can increase the number of generations of the corresponding DTC fault code in the event of OTAV authentication failure and, when the number of generations reaches a predetermined value or the fault code is generated with predetermined frequency or higher, change the OTAV authentication function check flag value to "TRUE".

When the OTAV authentication function check flat value is set to "TRUE", the following measure may be taken according to security level per controller.

a. The corresponding controller cannot be used: functions of the corresponding controller are stopped and, when the controller is connected to a tester, a driver can be notified of failure through display of a fault code for immediate checking and lighting of a vehicle warning indicator. In addition, manufacturer notification can be performed through interworking of telematics and a driver's cellular phone/emergency cell (E-CALL).

b. Use of the corresponding controller is restricted: at least part of the functions of the controller can be restricted and, when the controller is connected to the tester, a fault code for immediate checking can be displayed and a vehicle warning indicator may be turned on.

c. Use of the corresponding controller is indicated: a fault code for immediate checking can be displayed and a vehicle warning indicator can be turned on when the corresponding controller is connected to the tester.

A description will be given of a procedure through which the gateway uses an OTAV.

The gateway may include two storages using nonvolatile memories for storing OTAVs. One storage is preferably a new OTAV storage for storing OTAVs which are newly generated and unused and the other storage is preferably a used OTAV storage for storing used OTAVs. The two storages are logically discriminated from each other and physically different storage devices are not necessarily required.

The gateway may generate an OTAV using a random number generator and compare the generated OTAV with values stored in the used OTAV storage. When the generated OTAV corresponds to a value stored in the used OTAV storage, the gateway regenerates an OTAV. When the generated OTAV does not correspond to any value stored in the used OTAV storage, the gateway can store the generated OTAV in the new OTAV storage and transmit the OTAV to the controller.

For OTAV verification, the gateway may compare a hash value of an OTAV, received from the controller, with a hash value of the OTAV stored in the new OTAV storage. When the hash values are identical, the gateway may generate a symmetric key for the next session, send the symmetric key to the controller, copy the OTAV stored in the new OTAV storage to the used OTAV storage and then delete the OTAV stored in the new OTAV storage. Conversely, when the hash values differ from each other, the gateway may determine that authentication has failed and perform the conventional certificate based authentication procedure using a public key.

A description will be given of structures of a gateway and a controller configured for performing controller authentication according to an exemplary embodiment of the present invention with reference to FIGS. 9 and 10.

Figure 9:
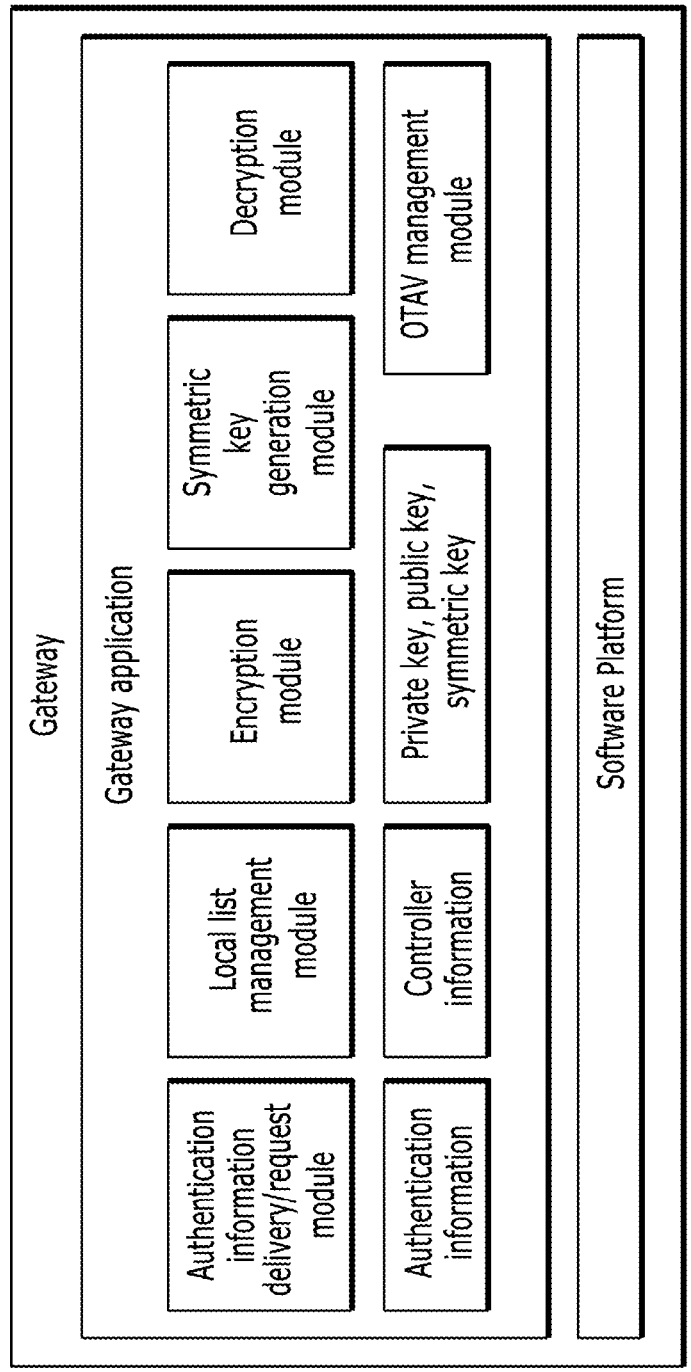
FIG. 9 illustrates a gateway software architecture according to another exemplary embodiment of the present invention.

FIG. 9 is an exemplary gateway software architecture according to another exemplary embodiment of the present invention.

The gateway software architecture illustrated in FIG. 9 is similar to that shown in FIG. 2 except that an OTAV management module is added and thus description of redundant modules is omitted for brevity.

The OTAV management module can execute functions of generating, storing and verifying an OTAV, which will be described in detail below.

OTAV generation: an OTAV to be used in controller authentication aforementioned with reference to FIG. 7. Here, previously generated OTAVs can be excluded through the aforementioned method of comparing the OTAVs with values stored in the used OTAV storage.

OTAV storages: this can include a new OTAV storage and a used OTAV storage using nonvolatile memories of the gateway. The OTAV storages are necessary to determine OTAV validity in OTAV generation and verification.

OTAV verification: in the case of controller authentication using an OTAV, a hash value of an OTAV transmitted from a controller is compared with a hash value of an OTAV generated/transmitted in the previous session to perform OTAV verification.

Figure 10:
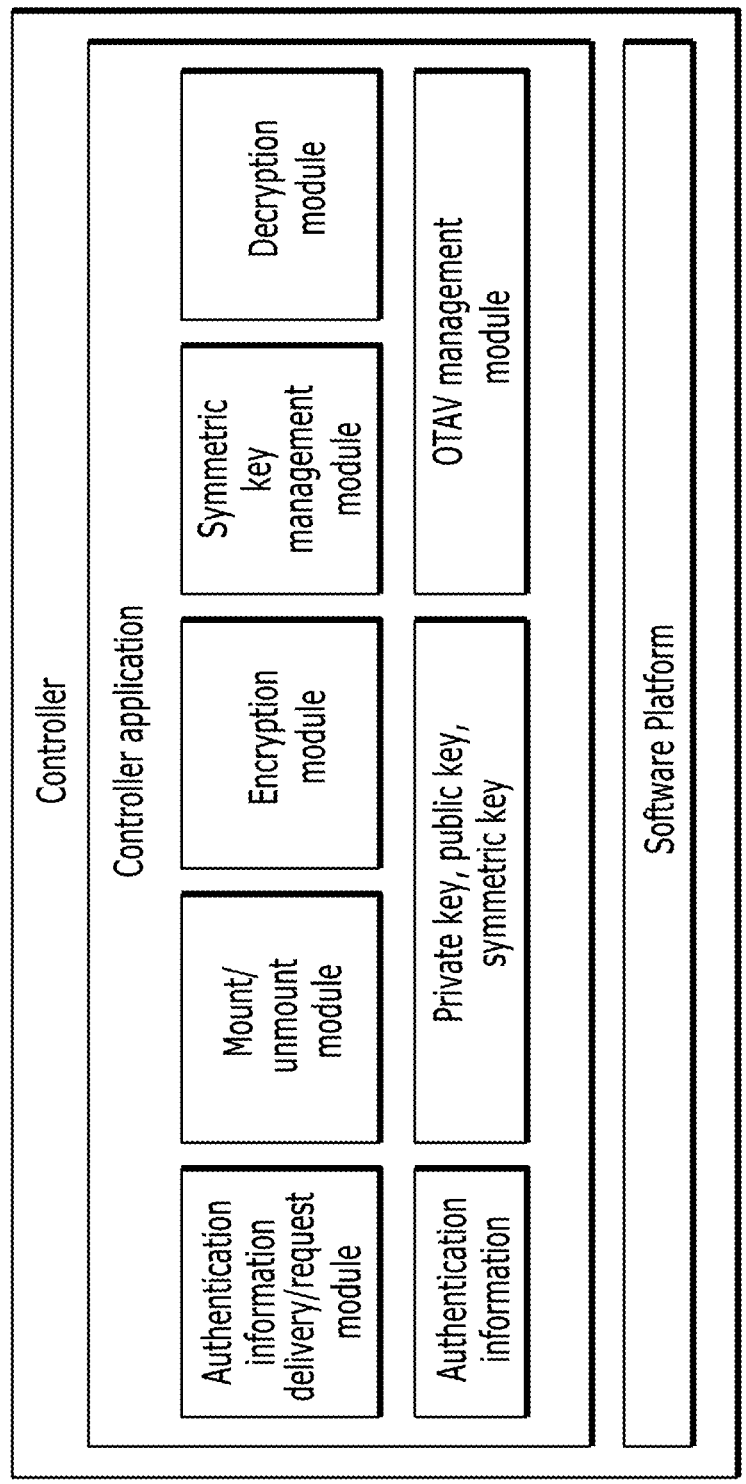
FIG. 10 illustrates an exemplary controller software architecture according to another exemplary embodiment of the present invention.

FIG. 10 illustrates an exemplary controller software architecture according to another exemplary embodiment of the present invention.

The controller software architecture illustrated in FIG. 10 is similar to that shown in FIG. 3 except that an OTAV management module is added and thus description of redundant modules is omitted for brevity.

The OTAV management module of the controller can function as a storage for storing OTAVs received from the gateway using a nonvolatile memory included in the controller, distinguished from the OTAV management module of the gateway.

According to the simplified controller authentication method according to another embodiment of the present invention, controller authentication efficiency during vehicle driving can be enhanced. Particularly, the authentication method according to the present embodiment performs authentication using a symmetric key and thus requires a short time for the initial process, compared to the conventional public key based authentication method. In addition, controller verification and key distribution can be performed within a time which does not affect vehicle driving even in the case of a controller having low computational capability, compared to the certificate based authentication method. Furthermore, since the authentication method according to the present embodiment does not require additional hardware, product price can be reduced by restraining a controller price increase.

A description will be given of a gateway/controller structure applicable to embodiments of the present invention with reference to FIG. 11.

Figure 11:
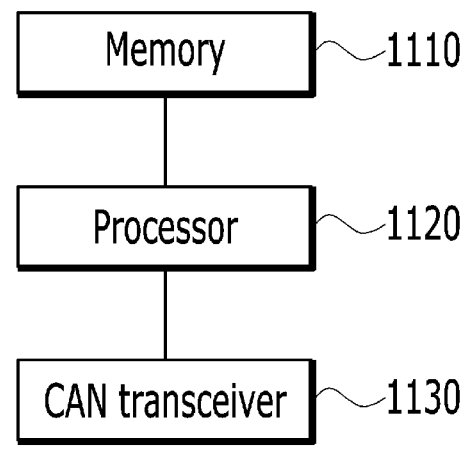
FIG. 11 illustrates an exemplary gateway/controller structure according to an exemplary embodiment of the present invention.

FIG. 11 illustrates an exemplary gateway/controller structure according to an exemplary embodiment of the present invention.

Referring to FIG. 11, a gateway/controller according to the present embodiment may include a memory 1110 for storing software modules described with reference to FIGS. 3, 4, 9 and 10, authentication data and keys, a processor (i.e. microcomputer) 1120 for performing control and operations according to software stored in the memory 1110, and a CAN transceiver 1130 for performing CAN communication for exchanging data with external devices. That is, data can be input from/output to external devices in the aforementioned processes through the CAN transceiver 1130 under the control of the processor 1120, and the processor 1120 can control overall operation of the gateway/controller in the aforementioned processes. For example, the processor 1120 can interpret a message received through the CAN transceiver 1130, perform an operation (encryption, decryption, signing, MAC generation, etc.) corresponding to the interpretation result, generate a message corresponding to the operation result (or message including data acquired as the operation result and suitable for transmission) and transmit the message to an external device through the CAN transceiver 1130.

The present invention may be implemented as computer-readable code and stored in a computer-readable recording medium. The computer-readable recording medium includes all kinds of storage devices storing data readable by a computer system. Examples of the computer-readable recording medium include a hard disk drive (HDD), a solid state drive (SSD), a silicon disc drive (SDD), a ROM, a RAM, a CD-ROM, a magnetic tape, a floppy disk, an optical data storage device, and a medium using a carrier wave (e.g. transmission through the Internet).

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of authenticating a controller by a gateway in a vehicle, comprising:
    transmitting a first symmetric key to the controller;
    generating a first one-time authentication value (OTAV), encrypting the first OTAV with the first symmetric key and delivering the encrypted first OTAV to the controller;
    sending a request for authentication using the first OTAV to the controller;
    receiving a hash value from the controller in response to the request,
    wherein the first symmetric key is encrypted using a third symmetric key corresponding to a session prior to a session in which authentication using the first OTAV is performed, and
    wherein the method further includes:
        determining a hash value using the first OTAV;
        comparing the received hash value with the determined hash value; and
        generating a second symmetric key when the received hash value is identical to the determined hash value; and
        authenticating the controller using a prestored certificate and public key when the received hash value differs from the determined hash value.

2. The method according to claim 1, further comprising:
    transmitting the second symmetric key along with a first random number to the controller;
    receiving, from the controller, the first random number encrypted with the second symmetric key and a second random number;
    comparing the first random number encrypted with the second symmetric key with the first random number stored in the gateway; and
    encrypting the second random number with the second symmetric key and transmitting the encrypted second random number to the controller when the first random number encrypted with the second symmetric key is identical to the first random number stored in the gateway.

3. The method according to claim 2, further comprising:
    generating a second OTAV, encrypting the second OTAV with the second symmetric key and delivering the encrypted second OTAV to the controller; and sending a request for authentication using the second OTAV to the controller.

4. The method according to claim 1, wherein the received hash value is in plaintext or is encrypted.

5. The method according to claim 2, wherein the second symmetric key and the first random number are encrypted with the first symmetric key.

6. The method according to claim 1, wherein the generating of the first OTAV comprises comparing the first OTAV with at least one previously generated and disused OTAV.

7. The method according to claim 6, further comprising:
copying the first OTAV from a second storage to a first storage when the received hash value is identical to the determined hash value, the at least one disused OTAV being stored in the first storage; and
deleting the first OTAV from the second storage.

8. A method of performing authentication by a controller with respect to a gateway in a vehicle, comprising:
receiving a first symmetric key from the gateway;
receiving a first one-time authentication value (OTAV), encrypted with the first symmetric key;
receiving a request for authentication using the first OTAV from the gateway; and
transmitting a hash value of the first OTAV to the gateway in response to the request,
receiving a second symmetric key and a first random number from the gateway when it is determined by the gateway that the transmitted hash value is identical to a hash value determined by the gateway; and
performing authentication with the gateway based on a certificate prestored in the gateway and a public key of the gateway when it is determined by the gateway that the transmitted hash value differs from the determined hash value,
wherein the first symmetric key is encrypted using a third symmetric key corresponding to a session prior to a session in which authentication using the first OTAV is performed.

9. The method according to claim 8, further comprising:
storing the second symmetric key and generating a second random number;
encrypting the first random number and the second random number and transmitting the encrypted random numbers to the gateway; and
receiving the second random number encrypted with the second symmetric key from the gateway.

10. The method according to claim 9, further comprising:
receiving a second OTAV encrypted with the second symmetric key from the gateway;
performing decryption using the second symmetric key to acquire the second OTAV; and
transmitting a hash value of the second OTAV to the gateway upon reception of a request for authentication using the second OTAV from the gateway.

11. The method according to claim 8, wherein the hash value is in plaintext or is encrypted.

12. The method according to claim 9, wherein the second symmetric key and the first random number are encrypted with the first symmetric key.

13. A non-transitory computer readable recording medium storing a program of executing a controller authentication method, wherein the
controller authentication method includes:
transmitting a first symmetric key to the controller;
generating a first one-time authentication value (OTAV), encrypting the first OTAV with the first symmetric key and delivering the encrypted first OTAV to the controller;
sending a request for authentication using the first OTAV to the controller;
receiving a hash value from the controller in response to the request,
wherein the first symmetric key is encrypted using a third symmetric key corresponding to a session prior to a session in which authentication using the first OTAV is performed, and
wherein the method further includes:
determining a hash value using the first OTAV;
comparing the received hash value with the determined hash value; and
generating a second symmetric key when the received hash value is identical to the determined hash value; and
authenticating the controller using a prestored certificate and public key when the received hash value differs from the determined hash value.

* * * * *